US012011943B2

(12) United States Patent

Miyoshi et al.

(10) Patent No.: US 12,011,943 B2

(45) Date of Patent: Jun. 18, 2024

(54) IMAGE FORMING APPARATUS

(71) Applicants: Toshiba Tec Kabushiki Kaisha, Tokyo (JP); PILOT CORPORATION, Tokyo (JP); THE PILOT INK CO., LTD., Aichi (JP)

(72) Inventors: Maiko Miyoshi, Izunokuni Shizuoka (JP); Hiroshi Kiyomoto, Hiratsuka Kanagawa (JP); Yui Hiyoshi, Mishima Shizuoka (JP); Taishi Fukazawa, Tokyo (JP)

(73) Assignees: TOSHIBA TEC KABUSHIKI KAISHA, Tokyo (JP); PILOT CORPORATION, Tokyo (JP); THE PILOT INK CO., LTD., Nagoya (JP)

( * ) Notice: Subject to any disclaimer, the term of this patent is extended or adjusted under 35 U.S.C. 154(b) by 84 days.

(21) Appl. No.: 17/697,754

(22) Filed: Mar. 17, 2022

(65) Prior Publication Data

US 2022/0297458 A1 Sep. 22, 2022

(30) Foreign Application Priority Data

Mar. 19, 2021 (JP) ................................. 2021-045919

(51) Int. Cl.
*B41J 2/21* (2006.01)
*B41M 5/00* (2006.01)

(52) U.S. Cl.
CPC .......... *B41M 5/0023* (2013.01); *B41J 2/2114* (2013.01)

(58) Field of Classification Search
CPC .. B41J 2/2114; B41M 5/0011; B41M 5/0017; B41M 5/0023; B41M 5/0029
See application file for complete search history.

(56) References Cited

U.S. PATENT DOCUMENTS

| | | | | |
|---|---|---|---|---|
| 4,732,810 A | 3/1988 | Kito et al. | | |
| 2006/0112851 A1 | 6/2006 | Ono et al. | | |
| 2010/0021840 A1 | 1/2010 | Sano et al. | | |
| 2010/0120614 A1 | 5/2010 | Ono | | |
| 2010/0255215 A1* | 10/2010 | Han | ..................... | G03G 9/0926 427/127 |
| 2010/0275813 A1 | 11/2010 | Kurihara | | |
| 2011/0212397 A1 | 9/2011 | Aoki et al. | | |
| 2012/0082472 A1 | 4/2012 | Tonohiro | | |

(Continued)

FOREIGN PATENT DOCUMENTS

| | | |
|---|---|---|
| EP | 3 954 745 A1 | 2/2022 |
| JP | S5144706 | 4/1976 |

(Continued)

OTHER PUBLICATIONS

JP Office Action for JP Appl. Ser. No. 2021-045919 dated Feb. 6, 2024 (6 pages).

*Primary Examiner* — Scott A Richmond

(74) *Attorney, Agent, or Firm* — Foley & Lardner LLP

(57) ABSTRACT

An image forming apparatus includes: a first supplying device configured to supply a first ink onto a recording medium to form a non-color print layer on the recording medium, the first ink comprising non-color particles; and a second supplying device configured to supply a second ink onto the recording medium having the non-color print layer formed thereon, to form a color print layer on the recording medium, the second ink including color pigment particles that are decolored when heated.

20 Claims, 3 Drawing Sheets

(56) References Cited

U.S. PATENT DOCUMENTS

| | | | |
|---|---|---|---|
| 2017/0355187 A1 | 12/2017 | Hashimoto et al. | |
| 2018/0127610 A1* | 5/2018 | Kido .................... | C09D 11/102 |

FOREIGN PATENT DOCUMENTS

| | | | |
|---|---|---|---|
| JP | S5144707 | | 4/1976 |
| JP | 2008-045062 | | 2/2008 |
| JP | 2011-043647 | A | 3/2011 |
| JP | 2012-078808 | A | 4/2012 |
| JP | 2012-223978 | A | 11/2012 |
| JP | 2020-187299 | A | 11/2020 |
| JP | 2021-049669 | A | 4/2021 |
| WO | WO-2009/060972 | A1 | 5/2009 |

* cited by examiner

IMAGE FORMING APPARATUS

CROSS-REFERENCE TO RELATED APPLICATIONS

This application is based upon and claims the benefit of priority from Japanese Patent Application No. 2021-045919, filed Mar. 19, 2021, the entire contents of which are incorporated herein by reference.

FIELD

Embodiments described herein relate generally to an image forming apparatus.

BACKGROUND

An image forming apparatus for printing on a recording medium using a decolorable ink is known. A decolorable ink is decolored at a predetermined temperature and becomes invisible. A decolored ink, however, can sometimes become visible likely as a result of the light scattering effect and the like of color pigment particles included in a decolorable ink.

DETAILED DESCRIPTION

1. Image Forming Apparatus

An image forming apparatus according to an embodiment includes: a first supplying device configured to supply a first ink onto a recording medium to form a non-color print layer on the recording medium, the first ink including non-color particles; and a second supplying device configured to supply a second ink onto the recording medium having the non-color print layer formed thereon, to form a color print layer on the recording medium, the second ink including color pigment particles that are decolored when heated.

The "second ink", which is an image forming ink, forms a color print layer on a recording medium and is decolored when heated. Thus, the "second ink" as used herein is also referred to as a "heat-decolorable ink". The heat-decolorable ink either may or may not redevelop color when cooled so long as it is decolored when heated. The "first ink", which does not contribute to image formation, forms a non-color print layer on a recording medium, thereby fulfilling the role of rendering less visible a heat-decolorable ink after decoloration (i.e., decolored pattern). Thus, the "first ink" as used herein is also referred to as a "decolored pattern-invisiblizing ink".

Hereinafter, an example of the image forming apparatus according to the embodiment will be described with reference to the accompanying drawings.

Figure 1:
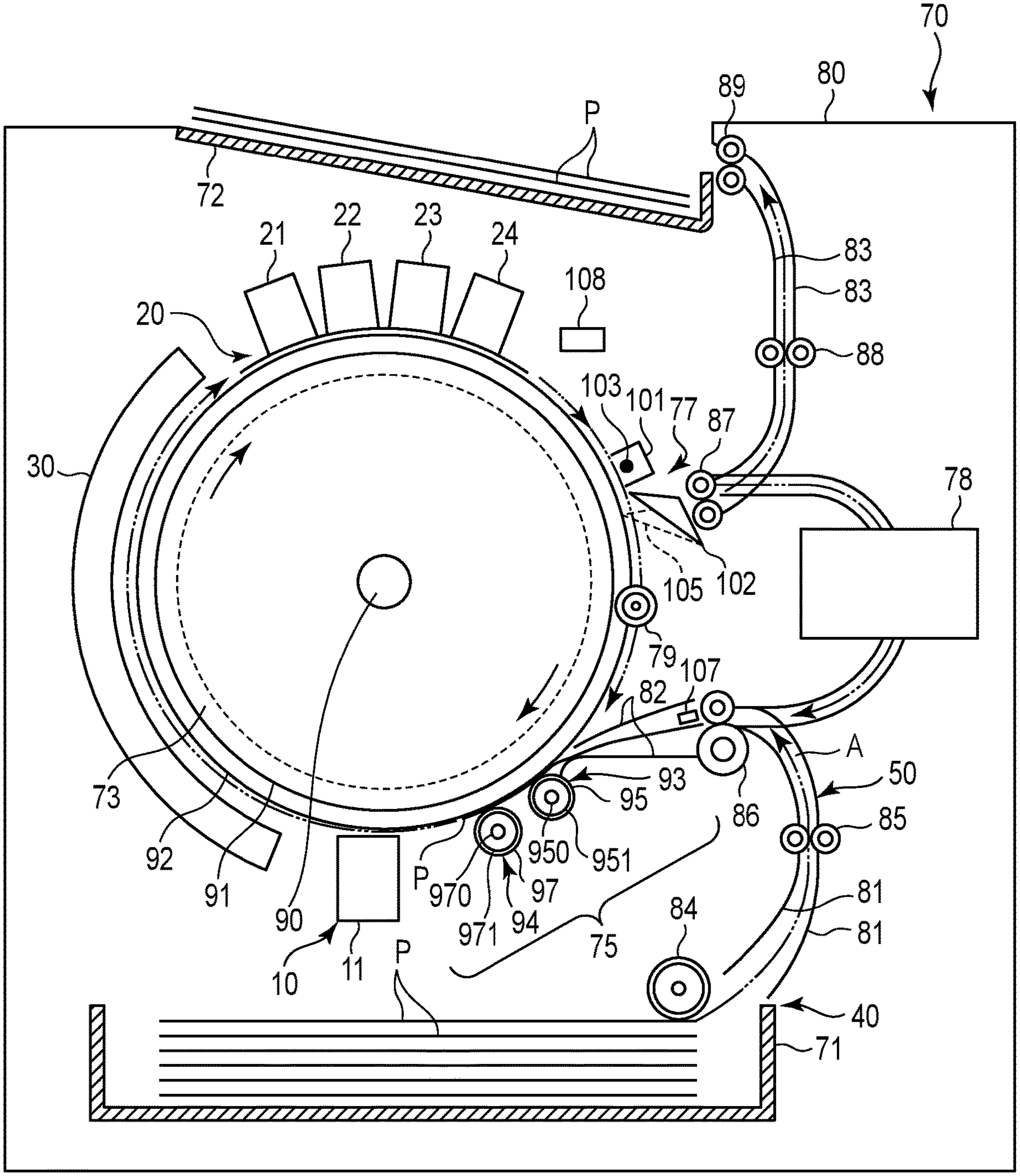
FIG. 1 is a schematic diagram showing an example of an image forming apparatus.

An image forming apparatus shown in FIG. 1 is an inkjet printer 70. The inkjet printer 70 is, for example, an apparatus that performs various kinds of processing such as image formation while conveying a sheet P, which is a recording medium.

The inkjet printer 70 includes: a housing 80; a paper discharge tray 72 in an upper part of the housing 80; and a paper feeding device 40, a conveying device 50, a holding roller 73, a holding device 75, a first supplying device 10, a drying device 30, a second supplying device 20, an electricity removing and peeling device 77, a cleaning device 79, and a reversing device 78, which are inside the housing 80.

The paper feeding device 40 includes a paper feeding cassette 71 and a pickup roller 84. The paper feeding cassette 71 holds a recording medium such as the sheet P. The pickup roller 84 is rotated by driving a conveying motor. Thereby, a recording medium at the top among the recording media held in the paper feeding cassette 71 is picked up.

The conveying device 50 conveys the sheet P along a conveying path A formed from the paper feeding cassette 71 to the paper discharge tray 72 through the holding roller 73.

The conveying device 50 includes a plurality of guide members 81 to 83 and a plurality of conveying rollers 85 to 89 along the conveying path A. As the conveying rollers, a paper feeding roller pair 85, a registration roller pair 86, a separating roller pair 87, a conveying roller pair 88, and discharge roller pair 89 are provided. The conveying rollers 85 to 89 are rotated by driving the conveying motor. Thereby, the sheet P is fed to the downstream side along the conveying path A.

A sheet position sensor 107 for detecting a leading end position of the sheet P is arranged near a nip of the registration roller pair 86 in the conveying path A. An operation panel with which a user can set various items is also provided. A temperature sensor 108 for detecting temperature in the inkjet printer 70 is arranged in the inkjet printer 70. Besides, a sensor for monitoring a conveyance state of the sheet P, and the like are arranged in various places.

The holding roller 73 includes a rotating shaft 90, a cylindrical frame 91 having a cylindrical shape and made of aluminum, and an insulating layer 92 on the surface of the cylindrical frame 91. The cylindrical frame 91 is grounded, and during charging by a charging roller 97, functions as a counter electrode while its potential is maintained at 0 V. The holding roller 73 rotates while holding the sheet P to thereby convey the sheet P. The holding roller 73 rotates in a direction indicated by the arrow in FIG. 1 to thereby convey the sheet P clockwise.

The holding device 75, the first supplying device 10, the drying device 30, the second supplying device 20, the electricity removing and peeling device 77, and the cleaning device 79 are arranged around the holding roller 73 in the order from the upstream side toward the downstream side.

The holding device 75 presses the sheet P against the outer surface of the holding roller 73 to thereby attract the sheet P to the surface (outer circumferential surface) of the holding roller 73. The holding device 75 includes a pressing device 93 for pressing the sheet P against the holding roller 73 and an attraction device 94 for attracting the sheet P to the holding roller 73 with static electricity.

The pressing device 93 includes a rotating shaft 950, a pressing roller 95 (a pressing member) facing the surface of the holding roller 73, and a pressing motor for driving the pressing roller 95.

The pressing roller 95 is rotated to thereby transition among a first state in which the pressing roller 95 presses the surface of the holding roller 73 with a first pressing force, a second state in which the pressing roller 95 presses the surface of the holding roller 73 with a second pressing force smaller than the first pressing force, and a third state in which the pressing roller 95 separates from the holding roller 73 and releases the pressing force.

A force applied between the pressing roller 95 and the holding roller 73 is set to a proper value at which neither the sheet P is deformed nor image quality deteriorated. When the sheet P passes through a nip section between the holding roller 73 and the pressing roller 95, the sheet P is pressed against the holding roller 73 by the pressing roller 95. Thereby, the sheet P adheres to the holding roller 73.

The outer circumferential surface of the pressing roller 95 is covered with an insulating layer 951, which is made of an insulating material, to prevent electrical charges of the charged sheet P from leaking through the pressing roller 95.

The attraction device 94 includes the charging roller 97 on the downstream side of the pressing roller 95. The charging roller 97 includes a chargeable charging shaft 970 made of metal and a surface layer section 971 on the outer circumference of the charging shaft 970. The charging roller 97 faces the holding roller 73. It is possible to supply electrical charges to the charging roller 97. The charging roller 97 can be moved relative to the holding roller 73.

If electrical power is supplied to the charging roller 97 while the charging roller 97 is close to the holding roller 73, a potential difference occurs between the charging roller 97 and the grounded cylindrical frame 91. This results in the generation of an electrostatic force in a direction in which the sheet P is attracted to the holding roller 73 (i.e., charging occurs). This electrostatic force attracts the sheet P to the surface of the holding roller 73.

The first supplying device 10, which is arranged below the holding roller 73, includes an inkjet head 11 for a decolored pattern-invisiblizing ink. As a treatment before image formation, that is, as a pretreatment, the inkjet head 11 ejects a decolored pattern-invisiblizing ink onto the sheet P to form a non-color print layer.

For example, the decolored pattern-invisiblizing ink may be supplied to the entire surface of the sheet P or to a region other than one where a color print layer is expected to be formed through ejection of an image forming ink. That is, the decolored pattern-invisiblizing ink may be supplied to at least a predetermined region other than one where a color print layer is expected to be formed through ejection of an image forming ink. More specifically, the decolored pattern-invisiblizing ink may be supplied such that a combination of the pattern of the non-color print layer and the pattern of the color print layer renders it difficult to identify the pattern of the color print layer.

The drying device 30, which is arranged on the downstream side of the first supplying device 10, dries the decolored pattern-invisiblizing ink applied onto the sheet P. The drying device 30 may be a heater or an air blower that blows in heated air. If it is desirable to dry the decolored pattern-invisiblizing ink completely, the holding roller 73 may be rotated at least one round while holding the sheet P having the decolored pattern-invisiblizing ink applied thereto, and image formation may be performed thereafter.

The second supplying device 20 forms an image on the sheet P held by the holding roller 73. The second supplying device 20, which is arranged above the holding roller 73, includes four inkjet heads 21, 22, 23, and 24 for heat-decolorable inks of four colors. The four inkjet heads 21, 22, 23, and 24 eject inks to the sheet P. For example, the inkjet heads 21, 22, 23, and 24 eject heat-decolorable inks of cyan, magenta, yellow, and black, respectively. Thereby, an image is formed on the sheet P.

The second supplying device 20 may include a plurality of inkjet heads for an image forming ink, as shown in FIG. 1, so that a color image can be formed. Alternatively, the second supplying device 20 may include a single inkjet head for an image forming ink, so that a monochrome image can be formed.

A drying device for drying a heat-decolorable ink applied to the recording medium may be provided on the downstream side of the second supplying device 20. Said drying device is capable of heating the recording medium having an image formed thereon to a temperature less than a decoloring temperature.

The electricity removing and peeling device 77 includes an electricity removing device 101 and a peeling device 102.

The electricity removing device 101 performs electricity removal for the sheet P. The electricity removing device 101, which is arranged further on the downstream side than the second supplying device 20, includes a chargeable electricity removing roller 103. The electricity removing device 101 supplies electrical charges and removes electricity from the sheet P to facilitate peeling the sheet P off the holding roller 73.

The peeling device 102 peels the sheet P off the surface of the holding roller 73 after the electricity removal. The peeling device 102, which is arranged on the downstream side of the electricity removing device 101, includes a movable separation claw 105. The separation claw 105 is movable between a peeling position, where the separation claw 105 is inserted between the sheet P and the holding roller 73, and a retracted position, where the separation claw 105 retracts from the holding roller 73. When the separation claw 105 is in the peeling position, the separation claw 105 peels the sheet P off the surface of the holding roller 73. In FIG. 1, the separation claw 105 is indicated by a broken line when in the peeling position, and by a solid line when in the retracted position.

The cleaning device 79 cleans the holding roller 73. The cleaning device 79 is arranged further along the downstream side than the electricity removing and peeling device 77. The cleaning device 79 includes: a cleaning member movable between a contact position, where the cleaning member is in contact with the holding roller 73, and a separation position, where the cleaning member retracts from the holding roller 73; and a cleaning motor for operating the cleaning member. The holding roller 73 rotates in a state where the cleaning member is in contact with the surface of the holding roller 73, whereby the surface of the holding roller 73 is cleaned.

The reversing device 78, which is arranged on the downstream side of the peeling device 102, reverses the sheet P peeled by the peeling device 102 and re-feeds the sheet P onto the surface of the holding roller 73. For example, the reversing device 78 guides the sheet P along a predetermined reversing path for switching back the sheet P reversely in the front-back direction to thereby reverse the sheet P.

Figure 2:
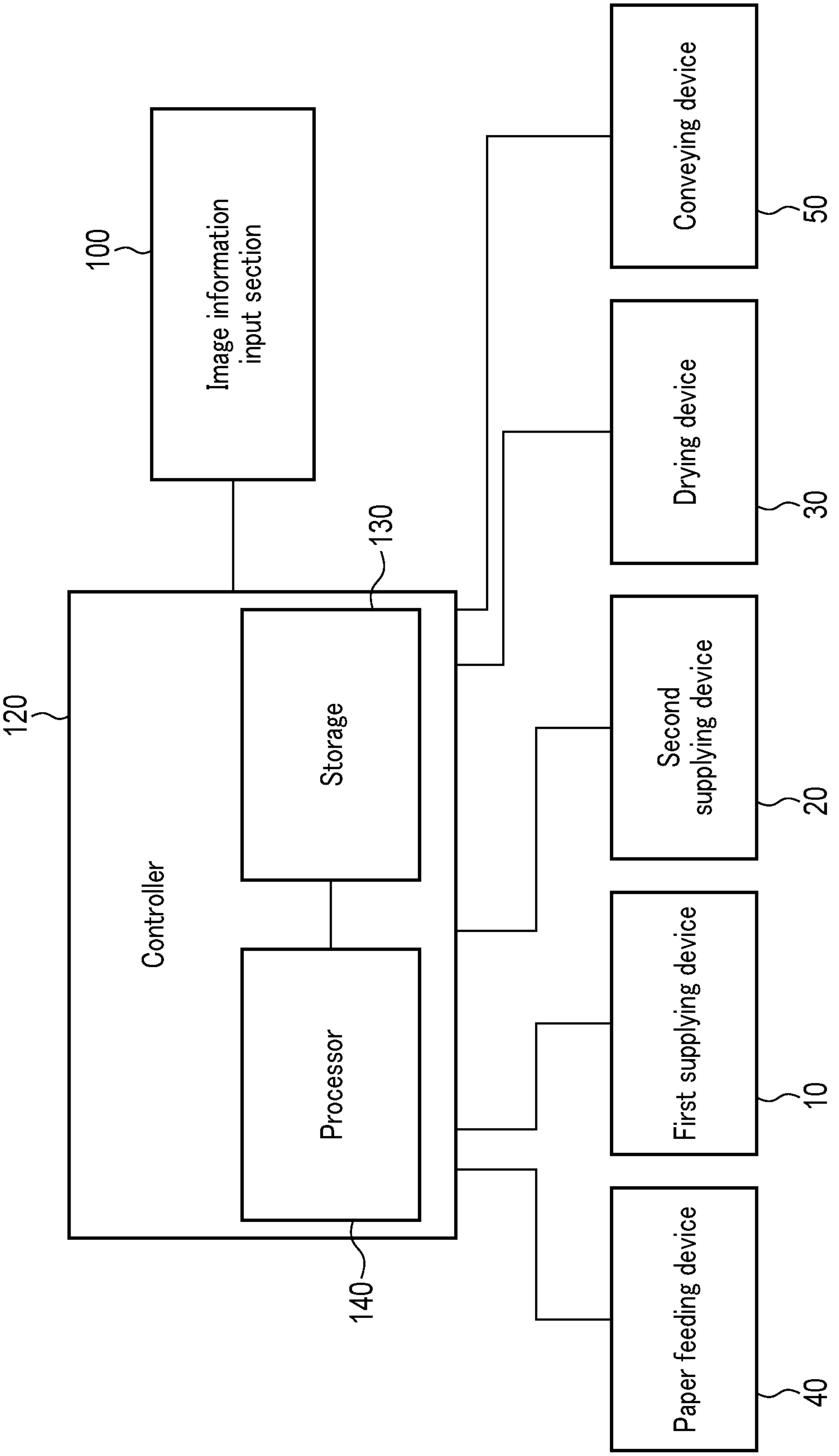
FIG. 2 is a block diagram showing a schematic configuration of a control system of the image forming apparatus.

The inkjet printer 70 further includes an image information input section 100 and a controller 120, as shown in FIG. 2.

The image information input section 100 imports image information to be printed on a recording medium such as the sheet P from an external recording medium or a network. The image information input section 100 provides the image information to the controller 120.

The controller 120 includes a storage 130 and a processor 140. The storage 130 includes, for example, a primary storage device (such as a random access memory (RAM)) and a secondary storage device (such as a read only memory (ROM)). The processor 140 includes a processor (such as a central processing unit (CPU)). For example, the secondary storage device stores a program that is interpreted and executed by the processor. For example, the primary storage device primarily stores image information provided by the image information input section 100, a program stored in the secondary storage device, data generated by the processor through computation processing, and the like. The processor interprets and executes a program stored in the primary storage device.

In this manner, the controller 120 controls the operations of the paper feeding device 40, the first supplying device 10, the second supplying device 20, the drying device 30, the conveying device 50, and the like based on the image information provided by the image information input section 100, and the like.

The controller 120 starts image processing for recording, and generates an image signal corresponding to image data and a control signal for controlling the operations of the respective rollers of the paper feeding device 40 and the conveying device 50, the respective inkjet heads of the first supplying device 10 and the second supplying device 20, the drying device 30, and the like.

Specifically, the controller 120 is capable of controlling the operations of the first supplying device 10 and the second supplying device 20 such that a combination of a non-color print layer formed by a decolored pattern-invisiblizing ink and a color print layer formed by a heat-decolorable ink forms a pattern which differs from a pattern of the color print layer. That is, the controller 120 is capable of controlling the operations of the first supplying device 10 and the second supplying device 20 such that the decolored pattern-invisiblizing ink is supplied to at least a predetermined region other than one where the color print layer is expected to be formed.

More specifically, the non-color print layer can be formed as described below. For example, the non-color print layer can be formed by solid printing. Formation of the non-color print layer by solid printing renders it completely impossible to identify the pattern of the color print layer. Alternatively, the non-color print layer may be formed to have a regular pattern such as a halftone dot, a stripe, or a checkered pattern. The non-color print layer may alternatively be formed to have a pattern of a character string unrelated to a character string presented by the color print layer, such as a pattern of a random character string. The non-color print layer may be alternatively formed to have an irregular pattern. The pattern of the non-color print layer may be any pattern as long as a combination of the pattern of the non-color print layer and the pattern of the color print layer renders it difficult to identify the pattern of the color print layer.

The inkjet printer 70 described above can be used in combination with a decoloring apparatus. The decoloring apparatus is capable of heating a recording medium with the non-color print layer and the color print layer formed thereon to a decoloring temperature or higher. The decoloring apparatus is not particularly limited, and may be, for example, a heating device such as a heater or a heating device that utilizes friction.

The inkjet printer 70 described above includes the first supplying device 10 including the inkjet head 11 for the decolored pattern-invisiblizing ink, in addition to the second supplying device including the inkjet heads 21, 22, 23, and 24 for the heat-decolorable ink. Thus, when a non-color print layer and a color print layer are formed using the above-described inkjet printer 70, and then decolored, the non-color particles included in the non-color print layer can reduce a difference in gloss between the portion with the color pigment particles attached thereto and the portion with no color pigment particles attached thereto, rendering the decolored pattern less visible.

Although an inkjet-type image forming apparatus is described herein as an example of the image forming apparatus, the image forming apparatus is not limited thereto. The image forming apparatus may be an image forming apparatus that uses a printing method such as screen printing, intaglio printing, or relief printing.

In the example of the image forming apparatus described above, inkjet printing is used to supply the decolored pattern-invisiblizing ink and the heat-decolorable ink onto the recording medium. The second supplying device may supply the heat-decolorable ink onto the recording medium by inkjet printing, and the first supplying device may supply the decolored pattern-invisiblizing ink onto the recording medium by a printing technique other than inkjet printing. For example, it is possible to supply the decolored pattern-invisiblizing ink onto the recording medium by roller coating so that the entire surface of the recording medium is ink-coated, then supply the heat-decolorable ink onto the recording medium by inkjet printing.

2. Image Forming Method

Image formation that renders a decolored pattern of the heat-decolorable ink less visible can be performed using the above-described image forming apparatus. Thus, according to another aspect, an image forming method is provided. Specifically, an image forming method according to an embodiment includes: supplying a decolored pattern-invisiblizing ink onto a recording medium to form a non-color print layer on the recording medium, the decolored pattern-invisiblizing ink including non-color particles; and supplying a heat-decolorable ink onto the recording medium having the non-color print layer formed thereon, to form a color print layer on the recording medium, the heat-decolorable ink including color pigment particles that are decolored when heated. An image thus formed can be decolored by heating.

The above method can be performed by referring to the descriptions given in “1. Image Forming Apparatus”. As described above, said method produces an advantageous effect that, after decoloration, the non-color particles included in the non-color print layer can reduce a difference in gloss between the portion with the color pigment particles attached thereto and the portion with no color pigment particles attached thereto, so that the decolored pattern can be made less visible.

3. Ink

Hereinafter, the ink used in the image forming apparatus and the image forming method described above, that is, the heat-decolorable ink and the decolored pattern-invisiblizing ink, will be described.

3-1. Heat-Decolorable Ink

The heat-decolorable ink may include color pigment particles, which are decolored when heated, and a dispersion medium (such as water). A known pigment which exhibits heat decolorability may be used as the color pigment particles. Color pigment particles may be either of an irreversible type which cannot be re-colored after decoloring or a reversible type which can repeat decoloration and coloration.

The color pigment particles are, for example, microcapsule particles. According to an example, the microcapsule particles include, as encapsulated components, (a) a color-developing compound, (b) a color developer, and (c) a decolorant. The color-developing compound (a) is a color-determining component, and may be a compound which develops a color by donating an electron(s) to the color developer. A representative example of the color-developing compound is a leuco dye. The color developer (b) may be a compound which receives an electron(s) from the color-developing compound and functions as a color developer of the color-developing compound. The decolorant (c) may be a compound which reversibly induces an electron transfer reaction between the color-developing compound and the color developer in a specific temperature range. The microcapsule particles including the components (a) to (c) are reversible-type particles and known.

Thus, known components may be used as the components (a) to (c). The ratio of the components (a) to (c) to be mixed may be suitably determined.

Figure 3:
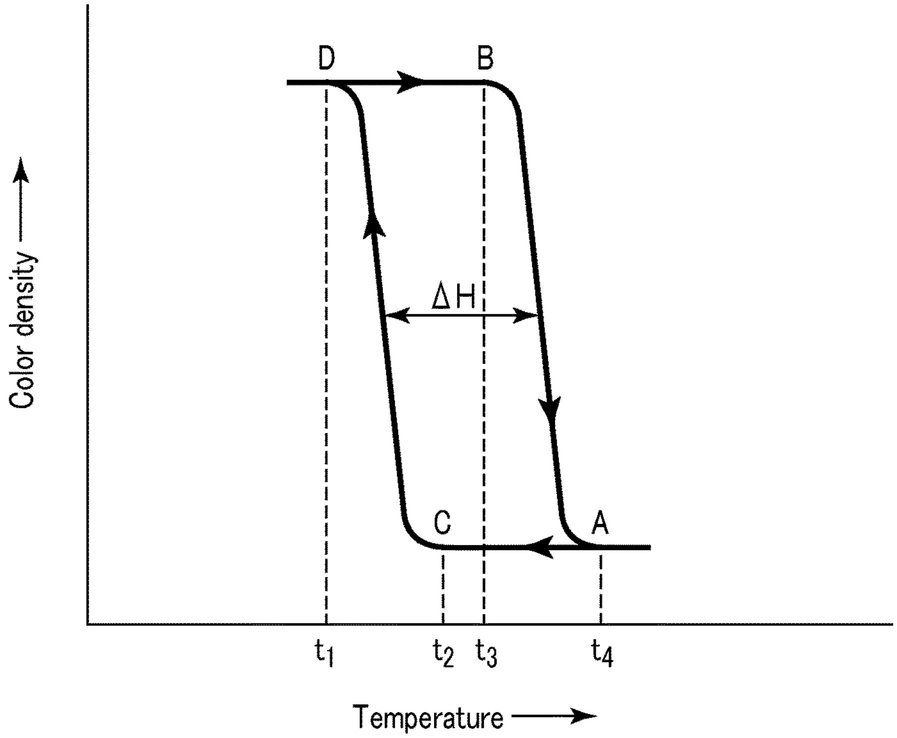
FIG. 3 is a graph illustrating the hysteresis characteristics of a thermochromic composition in a color density-temperature curve.

As a microcapsule pigment, it is possible to use microcapsule pigments described in Jpn. Pat. Appln. KOKOKU Publication No. S51-44706, Jpn. Pat. Appln. KOKOKU Publication No. S51-44707, Jpn. Pat. Appln. KOKOKU Publication No. H1-29398, etc., which encapsulate a reversibly thermochromic composition of heat-decoloring type which changes color above and below a predetermined temperature (color changing point), exhibits a decolored state in a temperature range not lower than an upper color changing point, exhibits a colored state in a temperature range not higher than a lower color changing point, and has characteristics in which only one specific state among the two states exists in a normal temperature range, the other being maintained only while heat or coolness required for its expression is being applied, the state in the normal temperature range being restored once the application of heat or coolness is terminated and in which a hysteresis width is relatively small (ΔH=1° C. to 7° C.) (see FIG. 3).

It is also possible to use microcapsule pigments encapsulating a reversibly thermochromic composition described in Jpn. Pat. Appln. KOKAI Publication No. 2006-137886, Jpn. Pat. Appln. KOKAI Publication No. 2006-188660, Jpn. Pat. Appln. KOKAI Publication No. 2008-45062, Jpn. Pat. Appln. KOKAI Publication No. 2008-280523, etc., and exhibiting a characteristic of large hysteresis. Namely, it is also possible to use a microcapsule pigment encapsulating a reversibly thermochromic composition which changes the color along very different paths in the curve of plots showing color density change, with temperature change taking place, between the temperature increase from a temperature side lower than the discoloring temperature range and the temperature decrease from a temperature side higher than the discoloring temperature range, and has color memorability in the specific temperature range (range between t2 and t3 [essentially two-phase retaining temperature range]), in which the color state depends either on the color-developed state in a temperature range lower than the complete coloring temperature (t1) or on the decolored state in a temperature range higher than the complete decoloring temperature (t4) (see FIG. 4).

Hysteresis characteristics of a microcapsule pigment encapsulating a reversibly thermochromic composition having color memorability in a color density-temperature curve will be described.

Figure 4:
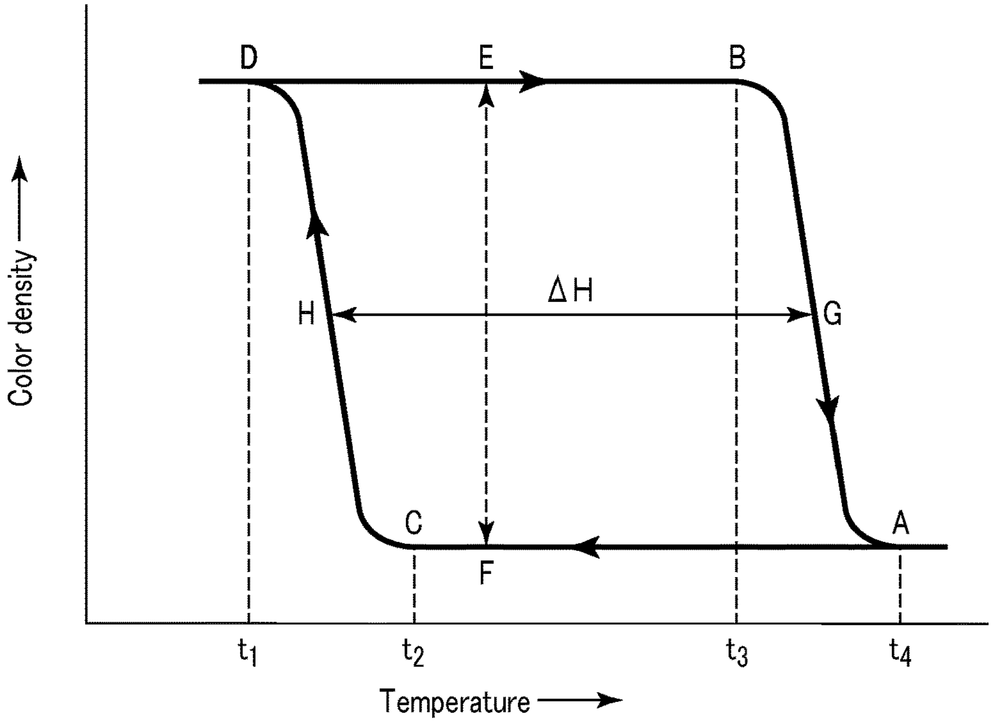
FIG. 4 is a graph illustrating the hysteresis characteristics of another thermochromic color-memory composition in a color density-temperature curve.

In FIG. 4, the color density is plotted on the ordinate and the temperature is plotted on the abscissa. A change in the color density due to temperature change proceeds along the arrow. Here, A is a point showing the density at a temperature t4 at which a completely decolored state is achieved (hereinafter referred to as "a complete decoloring temperature"); B is a point showing the density at a temperature t3 at which decoloring starts (hereinafter referred to as "a decoloring starting temperature"); C is a point showing the density at a temperature t2 at which coloring starts (hereinafter referred to as "a coloring starting temperature"); and D is a point showing the density at a temperature t1 at which a completely colored state is achieved (hereinafter referred to as "a complete coloring temperature").

The discoloration temperature range is a temperature range between t1 and t4, where both a colored state and a decolored state can be realized, and a temperature range between t2 and t3, where a difference in the color density is large, is essentially the discoloration temperature range.

The length of the line segment EF is a measure showing discoloration contrast, and the length of the line segment HG passing through the midpoint of the line segment EF is a temperature width showing the degree of hysteresis (hereinafter referred to as "a hysteresis width ΔH"). If the ΔH value is small, only a specified state of the two states before and after discoloration can exist in the ordinary temperature range. If the ΔH value is large, each state before and after discoloration can be easily maintained.

The complete decoloring temperature t4 is a temperature at which decoloration is caused by heat generated by a heater, a frictional heat generated by abrasion between a frictional member and a printed surface, or the like. A temperature at which decoloration is caused by heat generated by a heater, a frictional heat generated by abrasion between a frictional member and a printed surface, or the like is, for example, in a range of 50° C. to 90° C., preferably 55° C. to 85° C., and more preferably 60° C. to 80° C. The complete coloring temperature t1 can be a temperature obtained only in a freezer, a cold district, and the like, and is, for example, 0° C. or less, preferably in a range of −50° C. to −5° C., and more preferably in a range of −50° C. to −10° C.

Specific compounds to be used as the respective components (a), (b), and (c) of the reversibly thermochromic composition will be exemplified below.

The component (a), that is, an electron-donating color-developing organic compound, is a color-determining component which develops a color by donating an electron(s) to the component (b), which is a color developer.

Examples of the electron-donating color-developing organic compound include phthalide compounds, fluoran compounds, styrynoquinoline compounds, diazarhodamine lactone compounds, pyridine compounds, quinazoline compounds, and bisquinazoline compounds. According to an example, phthalide compounds or fluoran compounds may be used as the electron-donating color-developing organic compound.

Examples of the phthalide compounds include diphenylmethane phthalide compounds, phenylindolyl phthalide compounds, indolyl phthalide compounds, diphenylmethane azaphthalide compounds, phenylindolyl azaphthalide compounds, and derivatives of these compounds. According to an example, phenylindolyl azaphthalide compounds or their derivatives may be used as the phthalide compounds.

Examples of the fluoran compounds include aminofluoran compounds, alkoxyfluoran compounds, and derivatives of these compounds.

Examples of these compounds are listed below.

3,3-bis(p-dimethylaminophenyl)-6-dimethylaminophthalide, 3-(4-diethylaminophenyl)-3-(1-ethyl-2-methylindol-3-yl)phthalide, 3,3-bis(1-n-butyl-2-methylindol-3-yl)phthalide, 3,3-bis(2-ethoxy-4-diethylaminophenyl)-4-azaphthalide, 3-(2-ethoxy-4-diethylaminophenyl)-3-(1-ethyl-2-methylindol-3-yl)-4-azaphthalide,
3-(2-hexyloxy-4-diethylaminophenyl)-3-(1-ethyl-2-methylindol-3-yl)-4-azaphthalide,
3-[2-ethoxy-4-(N-ethylanilino)phenyl]-3-(1-ethyl-2-methylindol-3-yl)-4-azaphthalide,
3-(2-acetamido-4-diethylaminophenyl)-3-(1-propylindol-3-yl)-4-azaphthalide,
3,6-bis(diphenylamino)fluoran,
3,6-dimethoxyfluoran,
3,6-di-n-butoxyfluoran,
2-methyl-6-(N-ethyl-N-p-tolylamino)fluoran,
3-chloro-6-cyclohexylaminofluoran,
2-methyl-6-cyclohexylaminofluoran,
2-(2-chloroamino)-6-dibutylaminofluoran,
2-(2-chloroanilino)-6-di-n-butylaminofluoran,
2-(3-trifluoromethylanilino)-6-diethylaminofluoran,
2-(3-trifluoromethylanilino)-6-dipentylaminofluoran,
2-(dibenzylamino)-6-diethylaminofluoran,
2-(N-methylanilino)-6-(N-ethyl-N-p-tolylamino)fluoran,
1,3-dimethyl-6-diethylaminofluoran,
2-chloro-3-methyl-6-diethylaminofluoran,
2-anilino-3-methyl-6-diethylaminofluoran,
2-anilino-3-methoxy-6-diethylaminofluoran,
2-anilino-3-methyl-6-di-n-butylaminofluoran,
2-anilino-3-methoxy-6-di-n-butylaminofluoran,
2-xylidino-3-methyl-6-diethylaminofluoran,
2-anilino-3-methyl-6-(N-ethyl-N-p-tolylamino)fluoran,
1,2-benz-6-diethylaminofluoran,
1,2-benz-6-(N-ethyl-N-isobutylamino)fluoran,
1,2-benz-6-(N-ethyl-N-isoamylamino)fluoran,
2-(3-methoxy-4-dodecoxystyryl)quinoline,
spiro[5H-(1)benzopyrano(2,3-d)pyrimidine-5,1'(3'H)-isobenzofuran]-3'-one,2-(diethylamino)-8-(diethylamino)-4-methyl,
spiro[5H-(1)benzopyrano(2,3-d)pyrimidine-5,1'(3'H)-isobenzofuran]-3'-one,2-(di-n-butylamino)-8-(di-n-butylamino)-4-methyl,
spiro[5H-(1)benzopyrano(2,3-d)pyrimidine-5,1'(3'H)-isobenzofuran]-3'-one,2-(di-n-butylamino)-8-(diethylamino)-4-methyl,
spiro[5H-(1)benzopyrano(2,3-d)pyrimidine-5,1'(3'H)-isobenzofuran]-3'-one,2-(di-n-butylamino)-8-(N-ethyl-N-i-amylamino)-4-methyl,
spiro[5H-(1)benzopyrano(2,3-d)pyrimidine-5,1'(3'H)-isobenzofuran]-3'-one,2-(dibutylamino)-8-(dipentylamino)-4-methyl,
4,5,6,7-tetrachloro-3-[4-(dimethylamino)-2-methoxyphenyl]-3-(1-butyl-2-methyl-1H-indol-3-yl)-1(3H)-isobenzofuranone,
4,5,6,7-tetrachloro-3-[4-(diethylamino)-2-ethoxyphenyl]-3-(1-ethyl-2-methyl-1H-indol-3-yl)-1(3H)-isobenzofuranone,
4,5,6,7-tetrachloro-3-[4-(diethylamino)-2-ethoxyphenyl]-3-(1-pentyl-2-methyl-1H-indol-3-yl)-1(3H)-isobenzofuranone,
4,5,6,7-tetrachloro-3-[4-(diethylamino)-2-methylphenyl]-3-(1-ethyl-2-methyl-1H-indol-3-yl)-1(3H)-isobenzofuranone,
3',6'-bis[phenyl(2-methylphenyl)amino]-spiro[isobenzofuran-1(3H),9'-[9H]xanthen]-3-one,
3',6'-bis[phenyl(3-methylphenyl)amino]-spiro[isobenzofuran-1(3H),9'-[9H]xanthen]-3-one,
3',6'-bis[phenyl(3-ethylphenyl)amino]-spiro[isobenzofuran-1(3H),9'-[9H]xanthen]-3-one,
2,6-bis(2'-ethyloxyphenyl)-4-(4'-dimethylaminophenyl)pyridine,
2,6-bis(2',4'-diethyloxyphenyl)-4-(4'-dimethylaminophenyl)pyridine,
2-(4'-dimethylaminophenyl)-4-methoxy-quinazoline, and
4,4'-(ethylenedioxy)-bis[2-(4-diethylaminophenyl)quinazoline].

The fluorans may be the compounds which contain a substituent in a xanthene ring-forming phenyl group, and in addition, may also be compounds which have a blue or black color and which contain a substituent in a xanthene ring-forming phenyl group as well as in a lactone ring-forming phenyl group (these substituents may be, for example, an alkyl group such as a methyl group or a halogen atom such as a chloro group).

The component (b), that is, an electron-accepting compound, is a compound which receives an electron(s) from the component (a) and functions as a color developer of the component (a).

Examples of the electron-accepting compound include: active proton-containing compounds and derivatives thereof; pseudo-acidic compounds (which are not acids but each act as an acid in a composition to cause the component (a) to develop a color); and compounds with electron vacancies. According to an example, a compound selected from active proton-containing compounds may be used as the electron-accepting compound.

Examples of the active proton-containing compounds and derivatives thereof include phenolic hydroxyl group-containing compounds and metal salts thereof; carboxylic acids and metal salts thereof, specifically aromatic carboxylic acids, aliphatic carboxylic acids having 2 to 5 carbon atoms and metal salts thereof; acidic phosphoric acid esters and metal salts thereof; as well as azole-based compounds and derivatives thereof, and 1,2,3-triazole and derivatives thereof. According to an example, phenolic hydroxyl group-containing compounds may be used as the active proton-containing compounds and derivatives thereof since they can allow an effective thermochromic characteristic to be expressed.

The phenolic hydroxyl group-containing compounds include a wide range of compounds, ranging from monophenol compounds to polyphenol compounds, and bis-type and tris-type phenols, phenol-aldehyde condensation resins and the like are also included therein. According to an example, compounds which contain at least two benzene rings may be used as the phenolic hydroxyl group-containing compounds. Further, these compounds may also have a substituent, examples of which include an alkyl group, an aryl group, an acyl group, an alkoxycarbonyl group, a carboxy group and an ester thereof, as well as an amide group and a halogen group.

Examples of the metal contained in the metal salts of the active proton-containing compounds include sodium, potassium, calcium, zinc, zirconium, aluminum, magnesium, nickel, cobalt, tin, copper, iron, vanadium, titanium, lead, and molybdenum.

Specific examples are listed below.

phenol, o-cresol, tert-butyl catechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, resorcin, dodecyl gallate, 4,4-dihydroxydiphenylsulfone, bis(4-hydroxyphenyl)sulfide, 1,1-bis(4-hydroxyphenyl)ethane, 1,1-bis(4-hydroxyphenyl)propane, 1,1-bis(4-hydroxyphenyl)n-butane, 1,1-bis(4-hydroxyphenyl)n-pentane, 1,1-bis(4-hydroxyphenyl)n-hexane, 1,1-bis(4-hydroxyphenyl)n-heptane, 1,1-bis(4-hydroxyphenyl)n-octane, 1,1-bis(4-hydroxyphenyl)n-nonane, 1,1-bis(4-hydroxyphenyl)n-decane, 1,1-bis(4-hydroxyphenyl)n-dodecane, 1,1-bis(4-hydroxyphenyl)-2-methylpropane, 1,1-bis(4-hydroxyphenyl)-3-methylbutane, 1,1-bis(4-hydroxyphenyl)-3-methylpentane, 1,1-bis(4-hydroxyphenyl)-2,3-dimethylpentane, 1,1-bis(4-hydroxyphenyl)-2-ethylbutane, 1,1-bis(4-hydroxyphenyl)-2-ethylhexane, 1,1-bis(4-hydroxyphenyl)-3,7-dimethyloctane, 1,1-bis(4-hydroxyphenyl)cyclohexane, 1,1-bis(4-hydroxyphenyl)-3,3,5-trimethylcyclohexane, 1-phenyl-1,1-bis(4-hydroxyphenyl)ethane, 2,2-bis(4-hydroxyphenyl)propane, 2,2-bis(4-hydroxyphenyl)n-butane, 2,2-bis(4-hydroxyphenyl)n-pentane, 2,2-bis(4-hydroxyphenyl)n-hexane, 2,2-bis(4-hydroxyphenyl)n-heptan, 2,2-bis(4-hydroxyphenyl)n-octane, 2,2-bis(4-hydroxyphenyl)n-nonane, 2,2-bis(4-hydroxyphenyl)n-decane, 2,2-bis(4-hydroxyphenyl)n-dodecane, 2,2-bis(4-hydroxyphenyl)ethyl propionate, 2,2-bis(4-hydroxyphenyl)-4-methylpentane, 2,2-bis(4-hydroxyphenyl)-4-methylhexane, 2,2-bis(4-hydroxyphenyl)hexafluoropropane, 2,2-bis(4-hydroxy-3-methylphenyl)propane, 9,9-bis(4-hydroxy-3-methylphenyl) fluorene, 1,1-bis[2-(4-hydroxyphenyl)-2-propyl]benzene, bis(2-hydroxyphenyl)methane, 1,1,1-tris(4-hydroxyphenyl) ethane, and 3,3-bis(3-methyl-4-hydroxyphenyl)butane.

Although the compounds having phenolic hydroxyl groups can develop the thermochromic properties most effectively, it is also possible to use compounds selected from aromatic carboxylic acids, aliphatic carboxylic acids having 2 to 5 carbon atoms, metal salts of carboxylic acids, acidic phosphoric esters and metal salts thereof, and 1,2,3-triazole and derivatives thereof.

As the component (c), it is possible to use a carboxylic acid ester compound which discolors while showing a large hysteresis characteristic with regard to a color density-temperature curve (a curve plotting a change in color density with a temperature change taking place differs between the case where the temperature is changed from a low temperature side to a high temperature side and the case where the temperature is changed from a high temperature side to a low temperature side), is capable of forming a reversibly thermochromic composition having a color-memory property, and shows a ΔT value (melting point-cloud point) ranging from 5° C. to less than 50° C. Examples of the carboxylic acid ester compound include a carboxylic acid ester containing a substituted aromatic ring in the molecule, an ester of a carboxylic acid containing an unsubstituted aromatic ring with an aliphatic alcohol having 10 or more carbon atoms, a carboxylic acid ester containing a cyclohexyl group in the molecule, an ester of a fatty acid having 6 or more carbon atoms with an unsubstituted aromatic alcohol or phenol, an ester of a fatty acid having 8 or more carbon atoms with a branched aliphatic alcohol, an ester of a dicarboxylic acid with an aromatic alcohol or a branched aliphatic alcohol, dibenzyl cinnamate, heptyl stearate, didecyl adipate, dilauryl adipate, dimyristyl adipate, dicetyl adipate, distearyl adipate, trilaurin, trimyristin, tristearin, dimyristin, and distearin.

A fatty acid ester compound obtained from an aliphatic monohydric alcohol having an odd number of carbon atoms not less than 9, and an aliphatic carboxylic acid having an even number of carbon atoms, and a fatty acid ester compound with a total carbon number of 17 to 23 to be obtained from n-pentyl alcohol or n-heptyl alcohol and an aliphatic carboxylic acid having an even number from 10 to 16 of carbon atoms, can also be used.

Specific examples thereof include n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate, n-tridecyl stearate, n-pentadecyl stearate, n-nonyl eicosanoate, n-undecyl eicosanoate, n-tridecyl eicosanoate, n-pentadecyl eicosanoate, n-nonyl behenate, n-undecyl behenate, n-tridecyl behenate, and n-pentadecyl behenate.

Examples of the ketones include aliphatic ketones with a total carbon number of 10 or more, such as 2-decanone, 3-decanone, 4-decanone, 2-undecanone, 3-undecanone, 4-undecanone, 5-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone, and stearone.

Examples thereof further include aryl alkyl ketones with a total carbon number of 12 to 24, such as n-octadecanophenone, n-heptadecanophenone, n-hexadecanophenone, n-pentadecanophenone, n-tetradecanophenone, 4-n-dodecaacetophenone, n-tridecanophenone, 4-n-undecanoacetophenone, n-laurophenone, 4-n-decanoacetophenone, n-undecanophenone, 4-n-nonylacetophenone, n-decanophenone, 4-n-octylacetophenone, n-nonanophenone, 4-n-heptylacetophenone, n-octanophenone, 4-n-hexylacetophenone, 4-n-cyclohexylacetophenone, 4-tert-butylpropiophenone, n-heptaphenone, 4-n-pentylacetophenone, cyclohexyl phenyl ketone, benzyl n-butyl ketone, 4-n-butylacetophenone, n-hexanophenone, 4-isobutylacetophenone, 1-acetonaphthone, 2-acetonaphthone, and cyclopentyl phenyl ketone.

Examples of the ethers include aliphatic ethers with a total carbon number of 10 or more, such as dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, and undecanediol diethyl ether.

Examples of the alcohols include an aliphatic monohydric saturated alcohol having 10 or more carbon atoms, such as decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, and dococyl alcohol.

Examples of the acid amides include hexanamide, heptanamide, octanamide, nonanamide, decanamide, undecanamide, laurylamide, tridecanamide, myristamide, palmitamide, stearamide, and docosanamide.

The compounds exemplified in paragraphs [0053] to [0072] of International Publication No. 2020/209118 may also be employed as the component (c).

Further, various additives, such as an antioxidant, an ultraviolet absorber, an infrared ray absorber, a dissolution aid, a preservative, and a fungicide, may be added to microcapsule particles within a range that does not affect the function of the microcapsule particles.

According to an example, a mass ratio between the encapsulated material and the wall film of the microcapsule particles can fall within the range of 7:1 to 1:1. When the ratio of the wall film is within said range, both a decrease in the color density and a decrease in the vividness at the time of color development can be prevented. According to another example, a mass ratio between the encapsulated material and the wall film of the microcapsule particles can fall within the range of 6:1 to 1:1.

The microcapsule particles are chemically and physically stable. Thus, the microcapsule particles are maintained to have the same composition under various use conditions and can exhibit the same function effects under various use conditions.

Microencapsulation can be performed by the known method. Examples of the material of the wall film of the capsule include an epoxy resin, a urea resin, a urethane resin, and an isocyanate resin. Further, a secondary resin coating film may be formed on the surface of the microcapsule in accordance with the intended use, so as to impart the microcapsule with durability or to modify the surface properties.

The color pigment particles have an average particle size of, for example, 300 nm to 5000 nm, preferably 300 nm to 4000 nm, and more preferably 500 nm to 3000 nm. If the particle size is small, color development tends to degrade. If the particle size is large, dispersibility in the heat-decolorable ink and inkjet ejection performance tend to degrade.

As the average particle size of the microcapsule pigment, an average particle size (median size) of particles equivalent to an equal volume sphere is used. An optimum measurement thereof can be performed using a laser diffraction particle size distribution analyzer SALD7000 manufactured by Shimadzu Corporation, which is a laser diffraction/scattering particle size distribution analyzer calibrated by a direct measurement method.

Examples of the aforementioned direct measurement method include an image analysis method in which an area (i.e., two-dimensional) of each particle is measured from an image captured by a microscope to measure an equivalent diameter, and a Coulter method (electrical sensing zone method) using a Coulter counter in which a constant current is passed through a minuscule hole (aperture) of a detector and an equivalent diameter is measured from a change in the impedance caused when the particles pass through the hole. Calibration in a laser measurement method can be performed based on a value obtained by these direct measurement methods.

In the measurement of the average particle size by the image analysis method, for example, a region of particles is determined using an image analysis type particle size distribution measuring software "Mac-View" manufactured by Mountech Co., Ltd., a projected area equivalent circle diameter (Heywood diameter) is calculated from the area of the region of particles, and the average particle size is measured as an average particle size of particles equivalent to an equal volume sphere based on the calculated value.

The measurement of the average particle size by the Coulter method can be applied when the particle size of all particles or most of the particles exceed 0.2 μm, and can be performed using a particle size distribution analyzer "Multisizer 4e" manufactured by Beckman-Coulter, Inc.

The color pigment particles can be contained in an amount of, for example, 5 to 40% by mass, preferably 10 to 40% by mass, and more preferably 10 to 35% by mass with respect to the total amount of the heat-decolorable ink.

The heat-decolorable ink may include hollow resin particles in addition to the color pigment particles. According to an example, the hollow resin particles have a single hollow part inside the particles. The hollow resin particles have an interface between an outer shell made of a resin and the hollow part, in addition to an interface between the outer shell and the outside of the particles. The hollow resin particles have a light scattering effect due to a difference in refractive index between the outer shell and the outside of the particles and a difference in refractive index between the outer shell and the hollow part. The shape and the material of the hollow resin particles are not particularly limited as long as the particles have a light scattering effect. The hollow resin particles may have a single hollow part or a plurality of hollow parts. Porous particles may also be used as particles that exhibit the same effects as those of the hollow resin particles. The porous particles may have only continuous pores, only discontinuous pores, or both continuous pores and discontinuous pores.

The hollow resin particles generally have a spherical shape. Examples of the material of the hollow resin particles include acrylic-based resins such as acrylic resin, styrene-acrylic resin, and cross-linked styrene-acrylic resin, urethane-based resins, and maleic-based resins.

Since it is desired that precipitation of the hollow resin particles be less likely to occur in the heat-decolorable ink, a material having approximately the same specific gravity as that of the dispersion medium of the heat-decolorable ink can be used as the material of the hollow resin particles. The hollow part of the hollow resin particles may be filled with the dispersion medium when the hollow resin particles are contained in the heat-decolorable ink. Thus, if the material of the hollow resin particles has approximately the same specific gravity as that of the dispersion medium of the heat-decolorable ink, precipitation of the hollow resin particles in the heat-decolorable ink can be suppressed more reliably.

The hollow resin particles have an average particle size of, for example, 200 nm to 1500 nm, preferably 300 nm to 1500 nm, and more preferably 300 nm to 1300 nm. If the particle size is small, the light scattering effect tends to degrade. If the particle size is large, storage stability of the ink and inkjet ejection performance tend to degrade.

The average particle size of the hollow resin particles refers to a value obtained by the same method as the "method for obtaining the average particle size of the color pigment particles" explained above.

The hollow resin particles are not particularly limited; known particles and commercially available particles may be employed as the hollow resin particles. Examples of the hollow resin particles that can be employed include NIPOL MH8109 (having an average particle size of 1000 nm, manufactured by Zeon Corporation), ROPAQUE OP-84 (having an average particle size of 550 nm, manufactured by The Dow Chemical Company), ROPAQUE HP-1055 (having an average particle size of 1000 nm, manufactured by The Dow Chemical Company), ROPAQUE HP-433 (having an average particle size of 450 nm, manufactured by The Dow Chemical Company), ROPAQUE HP-91 (having an average particle size of 1000 nm, manufactured by The Dow Chemical Company), SX-866 (A) (having an average particle size of 300 nm, manufactured by JSR Corporation), and SX8782 (D) (having an average particle size of 300 nm, manufactured by JSR Corporation).

One kind of hollow resin particles may be used, or more than one kind of hollow resin particles may be used in combination.

A ratio between the average particle size of the color pigment particles and the average particle size of the hollow resin particles is not particularly limited, but may be, for example, 1:0.04 to 1:5, preferably 1:0.07 to 1:5, and more preferably 1:0.1 to 1:3.

The hollow resin particles can be contained in the heat-decolorable ink in an amount of, for example, 5 to 100 parts by mass, and preferably 10 to 50 parts by mass with respect to 100 parts by mass of the color pigment particles. If the amount of the hollow resin particles is small, the light scattering effect achieved by the hollow resin particles tends to degrade. If the amount of the hollow resin particles is large, color development of the ink tends to be affected, and storage stability of the ink and inkjet ejection performance tend to degrade.

Since the hollow resin particles have a light scattering effect, as described above, the heat-decolorable ink including the hollow resin particles can render a decolored pattern after decoloration less visible. In addition, since the hollow resin particles are made of resin, and the hollow part of the hollow resin particles may be filled with the dispersion medium when the hollow resin particles are contained in the heat-decolorable ink, precipitation of the hollow resin particles in the dispersion medium of the heat-decolorable ink is less likely to occur, thus resulting in favorable dispersibility. For these reasons, when the hollow resin particles are contained in the heat-decolorable ink, the hiding power exerted by the hollow resin particles is low and less likely to affect the color development of the ink.

Therefore, containing the hollow resin particles in the heat-decolorable ink can enhance the coloration and decoloration of the heat-decolorable ink.

The heat-decolorable ink may further include an additive in addition to the color pigment particles, the hollow resin particles, and the dispersion medium. For example, the heat-decolorable ink may further include general-purpose auxiliary agents such as a stabilizer, a viscosity-adjusting agent, a preservative, a moisturizer, a wetting agent, and a defoamer.

3-2. Decolored Pattern-Invisiblizing Ink

The decolored pattern-invisiblizing ink is a colorless and transparent ink. The decolored pattern-invisiblizing ink may include non-color particles and a dispersion medium (such as water). The term “non-color” as used herein refers to “transparent” or “white”.

As described above, the decolored pattern-invisiblizing ink forms a non-color print layer on a recording medium, thereby fulfilling the role of rendering less visible the heat-decolorable ink after decoloration (i.e., decolored pattern). Specifically, when the non-color particles included in the decolored pattern-invisiblizing ink are attached to a region other than one where the color print layer is formed by the heat-decolorable ink, the non-color particles can reduce, after decoloration, a difference in gloss between the portion with the color pigment particles of the heat-decolorable ink attached thereto and the portion with no color pigment particles of the heat-decolorable ink attached thereto, whereby the decolored pattern can be rendered less visible.

Therefore, particles having the same size as that of the color pigment particles of the heat-decolorable ink, or particles having the same light scattering effect as that of the color pigment particles after decoloration can be used as the non-color particles included in the decolored pattern-invisiblizing ink. The non-color particles are, for example, microcapsule particles.

The non-color particles have an average particle size of, for example, 300 nm to 5000 nm, preferably 300 nm to 4000 nm, and more preferably 500 nm to 3000 nm.

The average particle size of the non-color particles refers to a value obtained by the same method as the “method for obtaining the average particle size of the color pigment particles” explained above.

When the size of the non-color particles is represented in relation to the size of the color pigment particles, an average particle size D1 of the color pigment particles and an average particle size D2 of the non-color particles can satisfy a relationship represented by an inequality $0.5<D2/D1<5$. If said relationship is satisfied, there is almost no difference in gloss, after decoloration, between the portion with the color pigment particles attached thereto and the portion with the non-color particles attached thereto, whereby the heat-decolorable ink after decoloration (decolored pattern) can be rendered particularly less visible.

The non-color particles are, for example, colorless and transparent resin particles. A colorless and transparent polyester resin particles or the like may be used as such non-color particles. The colorless and transparent resin particles are not particularly limited; known particles and commercially available particles may be employed as the resin particles. Examples of the colorless and transparent resin particles that can be used include EPOSTAR MX200W (having an average particle size of 350 nm, manufactured by Nippon Shokubai Co., Ltd.), EPOSTAR MX300W (having an average particle size of 450 nm, manufactured by Nippon Shokubai Co., Ltd.), and VINYBLAN 902 (having an average particle size of 500 nm, manufactured by Nissin Chemical Industry Co., Ltd.).

Alternatively, the non-color particles may be particles obtained by decoloring color pigment particles. Particles prepared by heating color pigment particles to a temperature equal to or higher than a decoloring temperature to decolor the color pigment particles may be used as such non-color particles. Herein, color pigment particles used as a raw material are the color pigment particles described in “3-1. Heat-decolorable Ink”. The color pigment particles used as a raw material are, for example, microcapsule particles, and may include, as encapsulated components, (a) a color-developing compound, (b) a color developer, and (c) a decolorant.

According to an example, particles prepared using the color pigment particles included in the heat-decolorable ink applied to the same recording medium as a raw material may be used as the non-color particles. In this case, the color pigment particles included in the color print layer and the non-color particles included in the non-color print layer are completely the same; thus, there is no difference in gloss, after decoloration, between the portion with the color pigment particles attached thereto and the portion with the non-color particles attached thereto, whereby the heat-decolorable ink after decoloration (decolored pattern) can be rendered particularly less visible.

Color pigment particles used as a raw material of the non-color particles may be either of an irreversible type which cannot be re-colored after decoloring or a reversible type which can repeat decoloration and coloration.

If non-color particles are prepared using reversible color pigment particles as a raw material, the following feature can be achieved: even if a recording medium after decoloration may be re-cooled, re-development of a color by the non-color particles renders it impossible to recognize what image the decolored image is like. This feature becomes particularly pronounced when the non-color print layer is formed by solid printing.

If non-color particles are prepared using irreversible color pigment particles as a raw material, use of irreversible color pigment particles as the color pigment particles included in the heat-decolorable ink can also achieve the same feature. That is, even if a recording medium after decoloration may be re-cooled, it is impossible to recognize what image the decolored image is like because neither the color pigment particles nor the non-color particles re-develop color.

Alternatively, the non-color particles may be the same as the color pigment particles but for the non-color particles being free of a color-developing compound. Particles obtained by preparing color pigment particles without including a color-developing compound therein may be used as such non-color particles. Such non-color particles are the same as the color pigment particles described in "3-1. Heat-decolorable Ink" but for the non-color particles being free of a color-developing compound. That is, the non-color particles are, for example, microcapsule particles and may include (b) a color developer and (c) a decolorant as encapsulated components.

According to an example, particles obtained by preparing color pigment particles included in the heat-decolorable ink applied to the same recording medium without including a color-developing compound therein may be used as the non-color particles. In this case, the color pigment particles included in the color print layer and the non-color particles included in the non-color print layer are the same except for the presence or absence of the color-developing compound; thus, there is no difference in gloss, after decoloration, between the portion with the color pigment particles attached thereto and the portion with the non-color particles attached thereto, whereby the heat-decolorable ink after decoloration (decolored pattern) can be rendered particularly less visible.

The non-color particles can be contained in an amount of, for example, 5 to 40% by mass, preferably 10 to 40% by mass, and more preferably 10 to 35% by mass with respect to the total amount of the decolored pattern-invisiblizing ink.

The decolored pattern-invisiblizing ink may further include an additive in addition to the non-color particles and the dispersion medium. For example, the decolored pattern-invisiblizing ink may further include general-purpose auxiliary agents such as a stabilizer, a viscosity-adjusting agent, a preservative, a moisturizer, a wetting agent, and a defoamer.

EXAMPLES

[1] Preparation of Color Pigment Particles

Components, which are 2 parts by mass of 3-(4-diethylamino-2-hexyloxyphenyl)-3-(1-ethyl-2-methylindol-3-yl)-4-azaphthalide as a leuco dye, 4 parts by mass of 1,1-bis(4'-hydroxyphenyl)hexafluoropropane as a color developer, 4 parts by mass of 1,1-bis(4'-hydroxyphenyl)n-decane as a color developer, and 50 parts by mass of decanoic acid-4-benzyloxyphenylethyl as a decolorant, were heated and dissolved uniformly. A mixture thus obtained was mixed with 30 parts by mass of an aromatic polyisocyanate prepolymer as an encapsulator and 40 parts by mass of an auxiliary solvent. A solution thus obtained was emulsified and dispersed in 240 parts by mass of an aqueous solution of 10% polyvinyl alcohol, and stirring was continued at 70° C. for about an hour. Thereafter, 2.5 parts by mass of water-soluble aliphatic modified amine was added as a reactant, and stirring was further continued for six hours. Thereby, colorless capsule particles were obtained. The capsule particle dispersion thus obtained was further subjected to centrifugal separation, then put in a freezer (−30° C.) to be caused to develop a color. Ion-exchanged water was added thereto, whereby a fine particle dispersion containing 30 wt % of color pigment particles was obtained. When the fine particle dispersion obtained was measured according to the "method for obtaining an average particle size of color pigment particles" explained above, the average particle size (median size) was 1.3 μm. A complete decoloring temperature was 60° C.

[2] Preparation of Decolored Pattern-Invisiblizing Ink

<Preparation of Decolored Pattern-Invisiblizing Ink A>

30 Parts by mass of polyester resin (acid value 10 mg KOH/g, Mw 15000, Tg 58° C.), 1 part by mass of sodium dodecylbenzenesulfonate (Neopelex G-15 manufactured by Kao Chemicals), and 69 parts by mass of ion-exchanged water were mixed together, and the pH of a resulting mixture was adjusted to 12 with potassium hydroxide, to obtain a dispersion. The dispersion obtained was put into a high-pressure homogenizer NANO 3000 (manufactured by Beryu corp.) and subjected to a treatment at 150° C. and 100 Mpa, to obtain a resin fine particle dispersion. When the dispersion diameter of the dispersion obtained was measured according to the "method for obtaining an average particle size of color pigment particles" explained above, the average particle size (median size) was 1.0 μm.

33 Parts by mass of the above resin fine particle dispersion, 30 parts by mass of glycerin, 1 part by mass of SURFYNOL (registered trademark) 465 manufactured by Nissin Chemical Industry Co., Ltd., as an ejection stabilizer, 0.2 parts by mass of PROXEL (registered trademark) XL2 manufactured by Lonza as a preservative, and 35.8 parts by mass of pure water were mixed together, and a resulting mixture was stirred for an hour using a stirrer and then filtered. Thereby, a decolored pattern-invisiblizing ink A was obtained.

<Preparation of Decolored Pattern-Invisiblizing Ink B>

The color pigment particles obtained in [1] above were heated to 60° C. and allowed to stand for 24 hours, whereby the color pigment particles were decolored. 33 Parts by mass of the decolored color pigment particles, 30 parts by mass of glycerin, 1 part by mass of SURFYNOL (registered trademark) 465 manufactured by Nissin Chemical Industry Co., Ltd., as an ejection stabilizer, 0.2 parts by mass of PROXEL (registered trademark) XL2 manufactured by Lonza as a preservative, and 35.8 parts by mass of pure water were mixed together, the resulting mixture being stirred for an hour using a stirrer and then filtered. Thereby, a decolored pattern-invisiblizing ink B was obtained.

[3] Preparation of Heat-Decolorable Ink

<Preparation of Heat-Decolorable Ink A>

33 Parts by mass of the color pigment particles obtained in [1] above, 30 parts by mass of glycerin, 2 parts by mass of NIPOL MH 8109 (average particle size: 1000 nm) as hollow resin particles (manufactured by Zeon Corporation), 1 part by mass of SURFYNOL (registered trademark) 465 manufactured by Nissin Chemical Industry Co., Ltd., as an ejection stabilizer, 0.2 parts by mass of PROXEL (registered trademark) XL2 manufactured by Lonza as a preservative, and 33.8 parts by mass of pure water were mixed together, the resulting mixture being stirred for an hour using a stirrer and then filtered. Thereby, a heat-decolorable ink A was obtained.

<Preparation of Heat-Decolorable Ink B>

33 Parts by mass of the color pigment particles obtained in [1] above, 30 parts by mass of glycerin, 1 part by mass of SURFYNOL (registered trademark) 465 manufactured by Nissin Chemical Industry Co., Ltd., as an ejection stabilizer, 0.2 parts by mass of PROXEL (registered trademark) XL2 manufactured by Lonza as a preservative, and 35.8 parts by mass of pure water were mixed together, the resulting mixture being stirred for an hour using a stirrer and then filtered. Thereby, a heat-decolorable ink B was obtained.

[4] Evaluation of Decolorability

The decolorability was evaluated using the "decolored pattern-invisiblizing ink" and the "heat-decolorable ink" described above. Specifically, the inks described below were used to implement Examples 1 to 3 and Comparative Examples 1 to 2.

Example 1

"Decolored pattern-invisiblizing ink A" including colorless and transparent resin particles as non-color particles "Heat-decolorable ink A" including hollow resin particles as an additive Example 2

"Decolored pattern-invisiblizing ink A" including colorless and transparent resin particles as non-color particles "Heat-decolorable ink B" not including hollow resin particles as an additive Example 3

"Decolored pattern-invisiblizing ink B" including decolored color pigment particles as non-color particles "Heat-decolorable ink A" including hollow resin particles as an additive Comparative Example 1

No pretreatment using a decolored pattern-invisiblizing ink was performed.

"Heat-decolorable ink B" not including hollow resin particles as an additive

Comparative Example 2

No pretreatment using a decolored pattern-invisiblizing ink was performed.

"Heat-decolorable ink A" including hollow resin particles as an additive

Example 1

Printing was performed using an inkjet printer.

First, solid printing was performed using an inkjet printer with piezo heads, manufactured by TOSHIBA TEC CORPORATION, to apply the decolored pattern-invisiblizing ink A in a square region with sides of 10 cm on a recording medium. The non-color print layer thus formed was heated for 10 seconds using a drier and thereby fixed. The surface temperature of the recording medium at this time was 50° C. or less. YUPO paper was used as the recording medium.

Next, on the recording medium having the non-color print layer fixed thereon, a letter of the alphabet was printed with the heat-decolorable ink A by using the inkjet printer with piezo heads, manufactured by TOSHIBA TEC CORPORATION in the same manner The color print layer thus formed was heated for 10 seconds using a drier and thereby fixed. The surface temperature of the recording medium at this time was 50° C. or less.

Next, the resultant printed material was heated to 80° C. and decolored.

A check of a decolored pattern after the decoloration revealed the decolored pattern to be hardly visible and the letter unidentifiable.

Example 2

The same evaluation was performed as described in Example 1 except that the decolored pattern-invisiblizing ink A was used as a pretreatment and the heat-decolorable ink B was used as a printing ink.

A check of a decolored pattern after the decoloration revealed the decolored pattern to be very slightly visible but the letter unidentifiable.

Example 3

The same evaluation was performed as described in Example 1 except that the decolored pattern-invisiblizing ink B was used as a pretreament and the heat-decolorable ink A was used as a printing ink.

A check of a decolored pattern after the decoloration revealed the decolored pattern to be hardly visible and the letter unidentifiable.

Comparative Example 1

A letter of the alphabet was printed with the heat-decolorable ink B by using the inkjet printer with piezo heads, manufactured by TOSHIBA TEC CORPORATION. A print layer thus formed was heated for 10 seconds using a drier and thereby fixed. The surface temperature of the recording medium at this time was 50° C. or less.

Next, the printed material was heated to 80° C. and decolored.

A check of a decolored pattern after the decoloration revealed the letter to be identifiable.

Comparative Example 2

A letter of the alphabet was printed with the heat-decolorable ink A by using the inkjet printer with piezo heads, manufactured by TOSHIBA TEC CORPORATION. A print layer thus formed was heated for 10 seconds using a drier and thereby fixed. The surface temperature of the recording medium at this time was 50° C. or less.

Next, the printed material was heated to 80° C. and decolored.

When a decolored pattern after the decoloration was checked, the letter was slightly identifiable depending on the angle.

While certain embodiments have been described, these embodiments have been presented by way of example only, and are not intended to limit the scope of the inventions. These novel embodiments can be implemented in various other forms, and various omissions, replacements, and changes can be made without departing from the spirit of the invention. These embodiments and the modifications thereof are included in the scope and gist of the invention as well as in the inventions described in the accompanying claims and their equivalents.

What is claimed is:

1. An image forming apparatus, comprising:

a first supplying device configured to supply a first ink onto a recording medium to form a non-color print layer on the recording medium, the first ink comprising non-color particles; and a second supplying device configured to supply a second ink onto the recording medium having the non-color print layer formed thereon, to form a color print layer on the recording medium, the second ink comprising color pigment particles that are decolored when heated, wherein an average particle size D1 of the color pigment particles and an average particle size D2 of the non-color particles satisfy a relationship represented by an inequality 0.5<D2/D1<5.

2. The image forming apparatus according to claim 1, further comprising a controller configured to control operations of the first and second supplying devices such that a combination of the non-color print layer and the color print layer forms a pattern which differs from a pattern of the color print layer.

3. The image forming apparatus according to claim 1, wherein the non-color particles are particles obtained by decoloring the color pigment particles, or are same as the color pigment particles but for the non-color particles being free of a color-developing compound.

4. The image forming apparatus according to claim 1, wherein the non-color particles are particles obtained by decoloring the color pigment particles.

5. The image forming apparatus according to claim 1, wherein the non-color particles are same as the color pigment particles but for the non-color particles being free of a color-developing compound.

6. The image forming apparatus according to claim 1, wherein the second supplying device is configured to supply the second ink onto the recording medium by an inkjet method.

7. The image forming apparatus according to claim 6, wherein the first supplying device is configured to supply the first ink onto the recording medium by an inkjet method.

8. The image forming apparatus according to claim 1, wherein the second ink further comprises hollow resin particles.

9. An image forming method, comprising:

supplying a first ink onto a recording medium to form a non-color print layer on the recording medium, the first ink comprising non-color particles; and supplying a second ink onto the recording medium having the non-color print layer formed thereon, to form a color print layer on the recording medium, the second ink comprising color pigment particles that are decolored when heated, wherein at least one of the following items (i) and (ii) is satisfied:

(i) an average particle size D1 of the color pigment particles and an average particle size D2 of the non-color particles satisfy a relationship represented by an inequality 0.5<D2/D1<5; or (ii) the non-color particles are particles obtained by decoloring the color pigment particles, or are same as the color pigment particles but for the non-color particles being free of a color-developing compound.

10. The image forming method according to claim 9, wherein the formation of the non-color print layer and the formation of the color print layer are performed such that a combination of the non-color print layer and the color print layer forms a pattern which differs from a pattern of the color print layer.

11. The image forming method according to claim 9, wherein the item (i) is satisfied.

12. The image forming method according to claim 9, wherein the item (ii) is satisfied.

13. The image forming method according to claim 12, wherein the non-color particles are particles obtained by decoloring the color pigment particles.

14. An image forming apparatus, comprising:

a first supplying device configured to supply a first ink onto a recording medium to form a non-color print layer on the recording medium, the first ink comprising non-color particles; and a second supplying device configured to supply a second ink onto the recording medium having the non-color print layer formed thereon, to form a color print layer on the recording medium, the second ink comprising color pigment particles that are decolored when heated, wherein the non-color particles are particles obtained by decoloring the color pigment particles, or are same as the color pigment particles but for the non-color particles being free of a color-developing compound.

15. The image forming apparatus according to claim 14, further comprising a controller configured to control operations of the first and second supplying devices such that a combination of the non-color print layer and the color print layer forms a pattern which differs from a pattern of the color print layer.

16. The image forming apparatus according to claim 14, wherein the non-color particles are particles obtained by decoloring the color pigment particles.

17. The image forming apparatus according to claim 14, wherein the non-color particles are same as the color pigment particles but for the non-color particles being free of a color-developing compound.

18. The image forming apparatus according to claim 14, wherein the second supplying device is configured to supply the second ink onto the recording medium by an inkjet method.

19. The image forming apparatus according to claim 18, wherein the first supplying device is configured to supply the first ink onto the recording medium by an inkjet method.

20. The image forming apparatus according to claim 14, wherein the second ink further comprises hollow resin particles.

* * * * *